US010577195B2

(12) United States Patent
Baier et al.

(10) Patent No.: US 10,577,195 B2
(45) Date of Patent: Mar. 3, 2020

(54) LOADING HEAD OF A PNEUMATIC LOADING SYSTEM FOR BULK MATERIAL

(71) Applicant: Zeppelin Systems GmbH, Friedrichshafen (DE)

(72) Inventors: Hermann Baier, Eriskirch (DE); Stefan Bier, Meckenbeuren (DE); Christiane Preiss, Aulendorf (DE); Amelie Vollmer, Friedrichshafen (DE); Guido Winkhardt, Aulendorf (DE)

(73) Assignee: ZEPPLIN SYSTEMS GMBH, Friedrichshafen (DE)

( * ) Notice: Subject to any disclaimer, the term of this patent is extended or adjusted under 35 U.S.C. 154(b) by 0 days.

(21) Appl. No.: 16/105,157

(22) Filed: Aug. 20, 2018

(65) Prior Publication Data

US 2019/0135557 A1    May 9, 2019

(30) Foreign Application Priority Data

Aug. 18, 2017  (DE) .................. 10 2017 118 867

(51) Int. Cl.
  *B65G 53/52*  (2006.01)
  *B65G 53/04*  (2006.01)
(52) U.S. Cl.
  CPC .................. *B65G 53/04* (2013.01)
(58) Field of Classification Search
  USPC ....... 406/157, 158, 159, 160, 161, 162, 163; 222/408; 137/872; 414/206
  See application file for complete search history.

(56) References Cited

U.S. PATENT DOCUMENTS

| 575,550 | A | * | 1/1897 | Smith | .................. B01F 13/002 366/182.3 |
| 2,965,250 | A | * | 12/1960 | Johansson | ................. C21B 7/18 414/201 |
| 3,230,017 | A | * | 1/1966 | Cymara | ............... A01F 25/186 406/162 |
| 3,415,504 | A | * | 12/1968 | Smith | ...................... F27B 1/20 414/206 |
| 3,429,463 | A | * | 2/1969 | Blau | ........................ C21B 7/18 414/179 |

(Continued)

FOREIGN PATENT DOCUMENTS

| DE | 17 56 419 A1 | 4/1970 |
| DE | 22 33 454 A1 | 2/1973 |

(Continued)

*Primary Examiner* — Joseph A Dillon, Jr.
(74) *Attorney, Agent, or Firm* — Browdy and Neimark, PLLC

(57) ABSTRACT

A loading head (1, 30) of a pneumatic loading system for the uniform introduction of bulk material (49) into the inner space of container sections (45), wherein the loading head (1, 30) is arranged on the free end of a loading tube (12, 73), the outlet connector (7) of which has an outlet opening (10) which is directed toward a distribution head (13, 43) for the lateral deflection of the bulk material into the container section (45), which has an approximately conical deflection surface (15), wherein the distribution head (13, 43) is fastened at least in the direction of the longitudinal extension (X direction) of the container section (45) so that it can be shifted and locked on the loading head (1, 30).

10 Claims, 9 Drawing Sheets

(56) References Cited

U.S. PATENT DOCUMENTS

Figure 1:
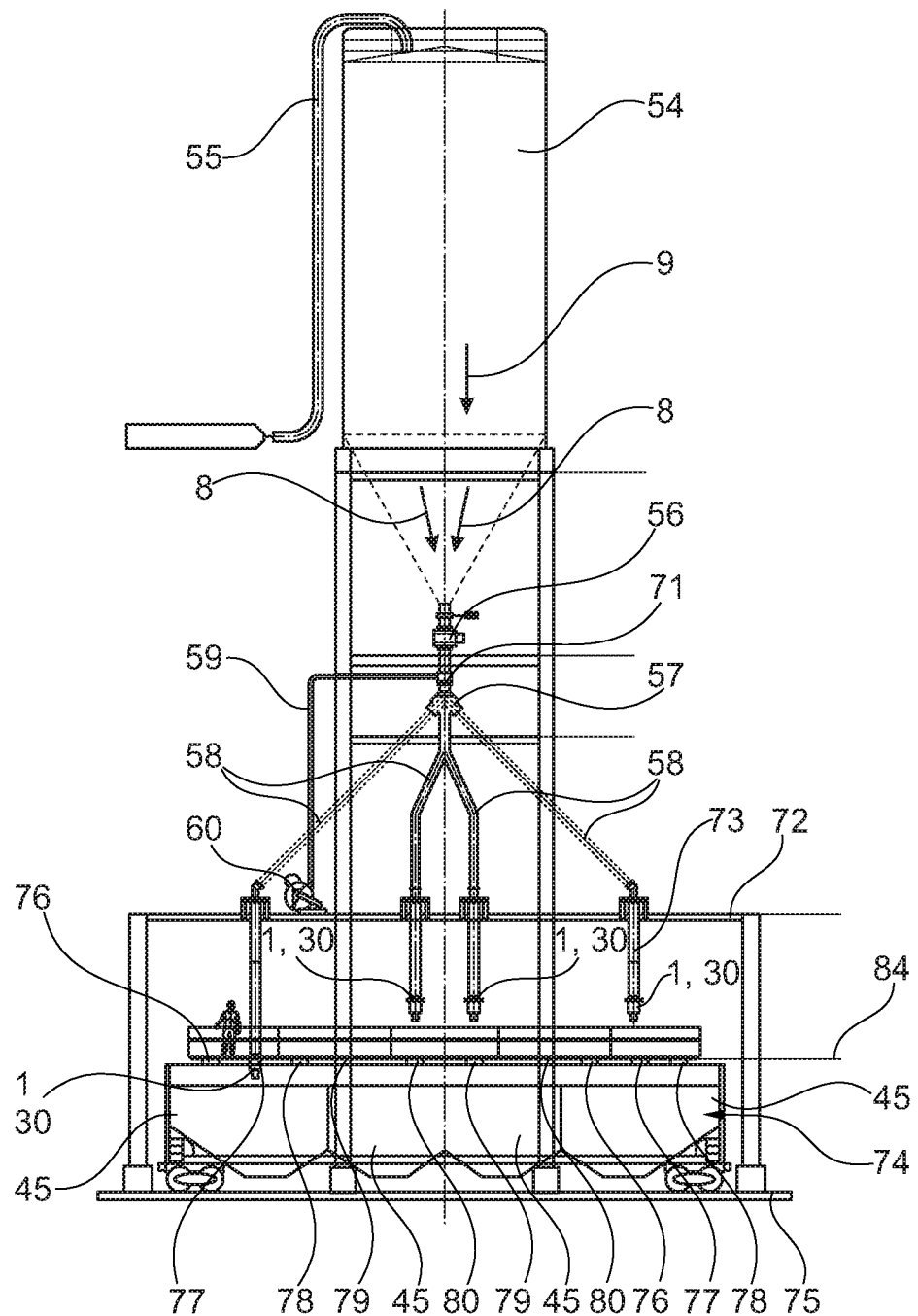

| | | | | |
|---|---|---|---|---|
| 3,469,718 A | * | 9/1969 | Felix | B05B 3/1007 414/301 |
| 3,533,522 A | * | 10/1970 | Schneider | C21B 7/18 266/184 |
| 3,868,028 A | * | 2/1975 | Mausser | A01D 87/0046 406/157 |
| 3,881,610 A | * | 5/1975 | Hessling | B65G 69/182 414/289 |
| 3,921,831 A | * | 11/1975 | Takahashi | C21B 7/20 193/16 |
| 4,029,220 A | * | 6/1977 | Greaves | C21B 7/20 193/29 |
| 4,039,431 A | * | 8/1977 | Baillie | B01J 8/0015 208/146 |
| 4,190,082 A | * | 2/1980 | Hernandez Crespo | F16K 11/00 137/625.17 |
| 4,239,424 A | * | 12/1980 | Pavolka | B65G 69/0441 406/157 |
| 4,370,154 A | * | 1/1983 | Namy | C21C 5/40 137/872 |
| 4,395,179 A | * | 7/1983 | Berzins | C21B 7/18 266/184 |
| 4,475,849 A | * | 10/1984 | Hilgraf | A23C 9/16 406/126 |
| 4,513,892 A | * | 4/1985 | Koeneman | F25C 5/24 222/235 |
| 4,529,337 A | * | 7/1985 | Hilgraf | A23C 9/16 239/518 |
| 4,599,028 A | * | 7/1986 | Mahr | C21B 7/20 193/31 A |
| 4,686,890 A | * | 8/1987 | Stouffer | F24F 13/06 137/872 |
| 4,764,184 A | * | 8/1988 | Meyer | C10J 3/02 414/206 |
| 4,986,456 A | * | 1/1991 | Johanson | B65D 88/548 222/195 |
| 5,393,189 A | | 2/1995 | Berquist | |
| 5,660,215 A | * | 8/1997 | Krambrock | B65G 69/181 141/236 |
| 5,755,837 A | * | 5/1998 | Beierle | C10B 1/04 202/262 |
| 6,004,090 A | * | 12/1999 | Axelsson | C21B 7/20 414/203 |
| 6,155,300 A | * | 12/2000 | Gross, Jr. | F16K 11/065 137/625.48 |
| 6,176,276 B1 | * | 1/2001 | Maunder | B65G 69/0475 141/286 |
| 6,481,946 B1 | * | 11/2002 | Lonardi | C21B 7/20 414/160 |
| 7,311,486 B2 | * | 12/2007 | Gorza | C21B 7/20 193/16 |
| 7,588,061 B2 | * | 9/2009 | Poussin | B01J 8/002 141/286 |
| 8,784,013 B2 | * | 7/2014 | Watson | B65G 53/56 137/561 A |
| 9,200,806 B2 | * | 12/2015 | Lin | B23P 17/04 |
| 9,816,245 B2 | | 11/2017 | Reinhardt | |
| 2003/0161694 A1 | * | 8/2003 | Bauver | B65G 53/528 406/1 |
| 2015/0191318 A1 | | 7/2015 | Martel | |

FOREIGN PATENT DOCUMENTS

| | | |
|---|---|---|
| DE | 44 38135 A1 | 5/1996 |
| EP | 3112535 A1 | 1/2017 |
| GB | 1375069 A1 | 11/1974 |

* cited by examiner

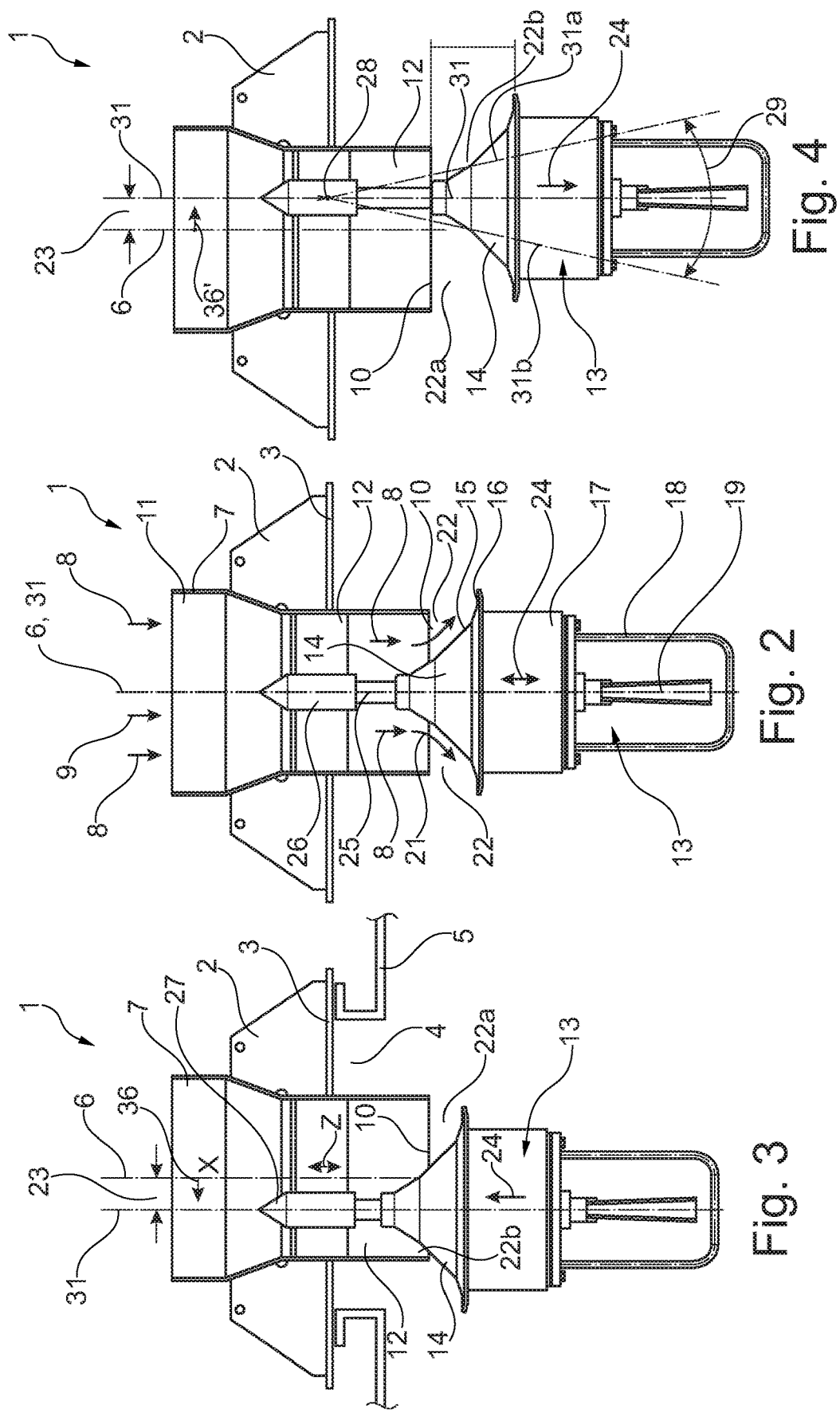

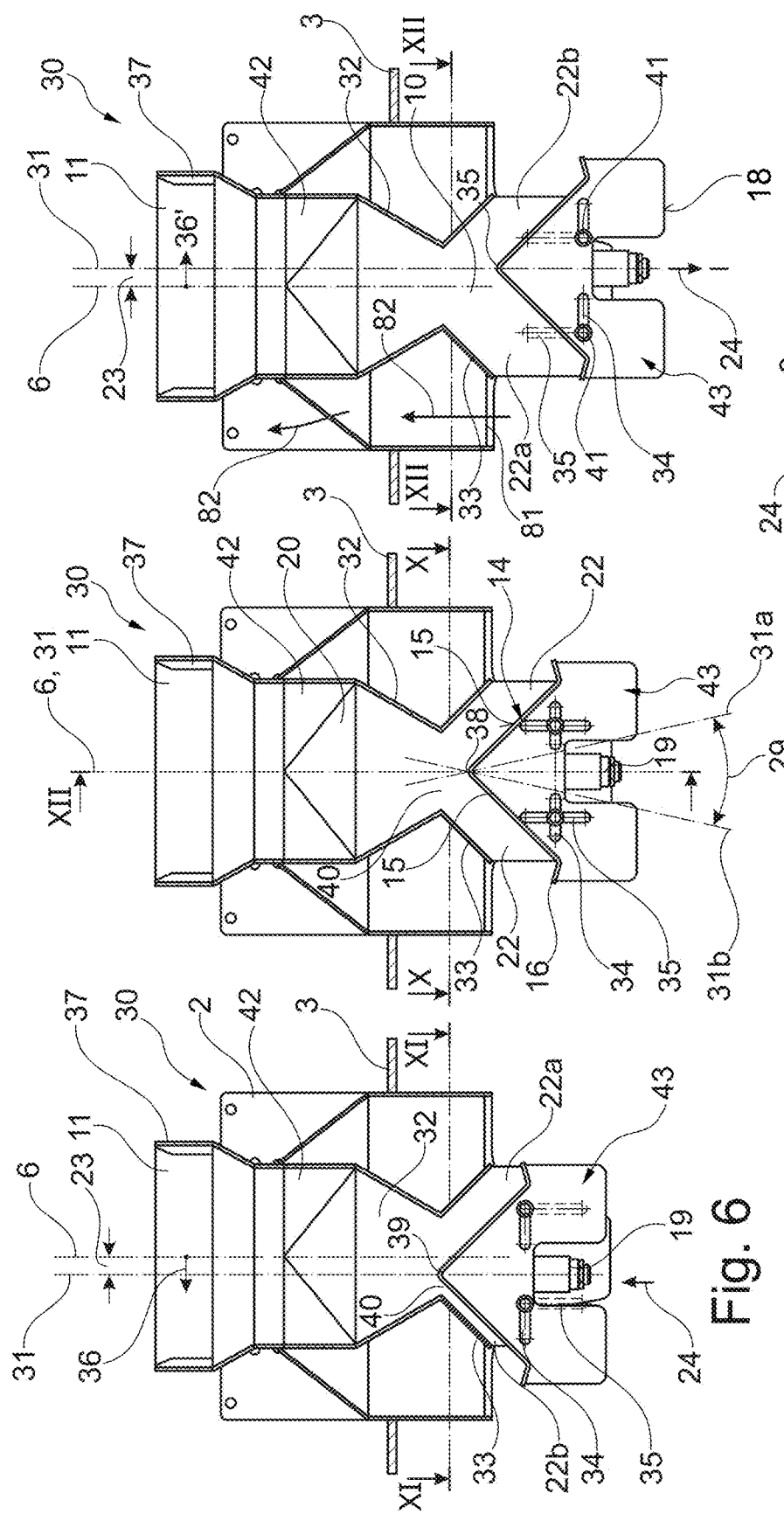

LOADING HEAD OF A PNEUMATIC LOADING SYSTEM FOR BULK MATERIAL

The invention relates to a loading head of a pneumatic loading system for the uniform introduction of bulk material into the inner space of container sections.

Such a loading head which is part of a loading device for bulk material is known, for example, from the subject matter of DE 44 38 135 A1. In such loading devices for bulk material, the bulk material stream has to be poured into a filling container, for example, a freight wagon or a section of a freight wagon, with sufficient speed so that the result is a largely horizontally uniform bulk material distribution in the filling container.

The mentioned published document achieves this in that, at the outlet end of the loading head, a deflection or acceleration channel is provided as exit nozzle, the cross section of which decreases from the inlet opening toward the outlet opening.

Accordingly, the printed document proposes a loading head in which the outlet channel narrows conically in the direction to the outlet end, so as to accelerate the bulk material stream in the direction to the inner space of the filling container. However, due to the rotationally symmetric design of the loading head, the disadvantage exists that an acentric filling of the filling containers is not possible. However, such an acentric filling is necessary, for example, if the dome cover opening is arranged offset in the longitudinal direction relative to the inner space of the filling container arranged under it and to be filled, and accordingly a non-uniform filling of the container is necessary in order to achieve the most horizontally and uniformly distributed filling level that is possible.

Due to the known rotationally symmetrical shape, the resulting disadvantage is that a uniform filling of a container is not possible with filling opening arranged offset in the longitudinal direction.

In particular, the known rotationally symmetrical loading heads fail if rail-guided freight wagons are to be filled, the container sections of which are designed as filling containers having a rectangular cross section. The length of the longitudinal extension (X direction) of the floor area of such a filling container is greater than the length of the transverse extension (Y direction) of said floor area.

In such a case, a uniform filling is not possible with a rotationally symmetric loading head, since said loading head distributes the filling material uniformly in all directions and thus an accumulation of filling material on the broadside of the container occurs, while a lesser filling level of the filling material on the long side has to be tolerated.

Therefore, the underlying aim of the invention is to develop a loading head of a pneumatic loading system for bulk material, in which a uniform filling of filling containers is possible even if the dome cover openings thereof are arranged offset relative to the longitudinal central axis or the filling containers have a shape of the inner space which deviates from the circular shape.

The invention starts with a loading head which consists of a fixed outlet connector with an outlet opening arranged there, outlet connector which is arranged on an associated housing connector, wherein, on the outlet end of the housing connector, a distribution head is arranged, over the surface of which the granular bulk material flows, and which carries out the lateral distribution of the bulk material in the filling container due to its approximately conical deflection surface.

To achieve the aim of uniformly filling a filling container with a dome cover arranged offset in direction of the longitudinal extension, the invention provides, according to a first proposed solution, that the distribution head can be shifted and locked in relation to the fixed loading tube-side outlet connector in the direction of the longitudinal extension of the filling container. Accordingly, it is designed to be longitudinally adjustable in the direction of the longitudinal extension of the filling container, that is to say in the X direction.

In a development, it is also possible to provide that filling containers having contours deviating from the circular floor area are also to be filled uniformly. In particular, filling containers having a rectangular floor area or also filling containers having an oval, semi-circular and other contour are to be filled uniformly.

This is achieved in that the distribution head can be shifted in relation to the fixed outlet connector in the X and/or Y direction. In addition to a longitudinal adjustability in the X direction of the container longitudinal axis, a transverse adjustability in the Y direction of the container transverse axis is accordingly also optionally provided.

While accordingly the shifting direction of the distribution head in the direction of the longitudinal extension of a rectangular container is denoted as the X direction, according to the additional proposal of the invention, a shifting in the Y direction is also provided, which means that the distribution head is also arranged in the outlet connector so that it can be shifted perpendicularly to the direction of the longitudinal extension of the filling container.

This results in the advantage that, in particular in the case of dome cover openings positioned acentrically on a container, a uniform loading of the container with a distribution head which can be shifted in the X-Y direction can also occur in an outlet connector, wherein the outlet connector rests in the acentric dome cover opening.

Application cases exist in which a bulk material stream is configured so that it does not run centrally into the fixed outlet connector but instead already presents a non-uniform distribution of the product within the distribution line, which ensures that the bulk material stream runs acentrically into the container, even in the case of a central arrangement of the distribution head. Such faults should also be controlled in accordance with the features of the present invention, in that it is provided that the distribution head can be shifted in the X and/or the Y direction and, according to an additional feature, it can be provided that the distribution head is also designed additionally so that it can be tilted or inclined at an angle with respect to its vertical longitudinal extension.

Such an acentric filling stream can be produced, for example, by a filling tube positioned at a slant. This also leads to a non-uniform filling of the filling container if the measures according to the invention are not found on the distribution head, which is thus designed so that it can be shifted and locked in the X and/or the Y and/or the Z direction and moreover can also be tilted.

As an additional measure, a shifting in the Z direction is thus provided. This means that it is designed so that, in the direction of its longitudinal extension, it can be lifted and lowered and locked. The adjustment and locking in the Z direction is particularly important, since such an adjustment changes the cross section of the outlet channel in the outlet opening in the housing-side outlet connector. Thus, the distribution head can be designed so that it can be adjusted and locked in the Z direction on the outlet opening in the outlet connector, decreases or increases the cross section of the lateral outlet channels.

Thus, different bulk materials having different pouring properties can be controlled, and, in particular, the flight width, flight inclination and flight direction of the bulk material flowing over the distribution head in the direction of the inner space of the filling container can be adjusted. In addition, the speed of the air-particle mixture can be controlled thereby.

In a first design of the invention, it is provided that the loading head has a substantially circular profile, which allows a particularly easy production. It is also suitable for non-rectangular filling containers. This embodiment can be used in particular also for oval or elliptical filling containers.

In an additional preferred embodiment, the invention provides that the loading head has a rectangular profile, wherein the longitudinal extension of the rectangular profile is parallel to the longitudinal extension of the rectangular container to be filled or in alignment therewith. In this first embodiment, it is provided that a bulk material delivery occurs only in the X direction, while no bulk material delivery occurs in the Y direction.

However, in another embodiment of the invention, it can be provided that the distribution head also performs, in addition to the bulk material discharge in the X direction, at least partially a filling of granular bulk material and a discharge of granular bulk material in the direction of the Y axis.

In a preferred embodiment example, the filling process occurs as follows:

The product enters the loading head via the inlet tube having an inner diameter of 250 mm, for example.

A loading head having a rectangular or square profile then has the following functions:

A lateral narrowing is integrated at the outlet of the tube, so that the product strikes the edge of the distribution metal sheets in the distribution head and is divided uniformly on the deflection surfaces formed thereby. This narrowing has a length of 90 mm and is set at an angle of 45°. The opening of the system is 110 mm. Subsequently, the product is divided over the two column-shaped outlet channels and discharged. The distribution metal sheets in triangular cross section have a length of 180 mm and a radial outward widening of 30 mm with a 15° bend relative to the horizontal at the end of the metal sheet which is referred to below as drop plate. The radially outward directed bend of the drop plate is used as a (jumping) ramp for the product, which is directed at a slant toward the roof of the filling container, so that the optimal throwing height for the granular bulk material is also achieved.

In order to control the product stream depending on the position of the loading device and in order to convey at all times the largest product stream onto the longest side, a screw connection is arranged laterally with respect to the head. With the aid of this connection, it is possible to control the slot size of the product inlet as well as of the product outlet. This means that a unit that can be adjusted both vertically and horizontally is ensured.

In addition, in this system, the air discharge plays a role. Due to the rectangular geometry, it is possible to let the air out through the same hole (this can be the filling connector or the aeration opening) where the product stream also enters. A lateral removal by means of a leakage air collection pot can also be installed.

Moreover, retractable safety struts are installed in the distribution head so as not to impede the product stream during the transport.

In the pneumatic filling of filling containers of all types, it is important that the air collected in the interior space of the filling container, consisting in part of the air supplied from the bulk material and in part of air stored there, is removed in a controlled manner.

In a first embodiment, this can occur via a second dome cover designed as a ventilation or also via the inventive loading head which provides corresponding air removal devices for air escaping from the inner space.

Of primary importance for the present invention is the achievement of the advantage of a maximum filling of a container in order to achieve an optimal and uniform filling without transporting unnecessary empty space.

According to the invention, it has been indicated that, in a first embodiment, the distribution head is designed so that it can be shifted in the X direction and locked, for which four simple adjustment screws can be provided, which are arranged in distribution head-side elongate hole guides.

In this way, the distribution head can be shifted by means of the elongate holes arranged there in the locking screws fixed on the housing side and locked.

In a development of the present invention, an adjustment and locking of the distribution head can also occur in the X and/or Y direction, so that the elongate holes then intersect and an adjustment both in the X direction and also an adjustment in the Y direction is possible.

Such an adjustment with the aid of adjustable and lockable locking screws can also be replaced by other locking means such as, for example, eccentric clamp connections, wedge connections and the like.

Instead of using locking screws that can be adjusted with a tool, it is accordingly also possible to use adjustment means that require no tool, such as the above-mentioned clamping or sliding or wedge connections.

In a development of the invention, it is possible to provide that the adjustment movements are not carried out in the case of a loading head removed from the filling container, but instead that an automatic adjustment and resetting of the position of the distribution head in the loading head occurs during the filling process. For this purpose, corresponding drive means are then provided, such as, for example, electromechanically driven threaded spindles or fluidically driven piston-cylinder arrangements and the like, in order to enable, during the loading process, an adaptation of the distribution direction of the distribution head to the concrete filling situation in the filling container.

In this case, a suitable optical system can be arranged in the distribution head, which consists, for example, of a radar sensor, an ultrasound sensor or the like, in order to detect the current filling level and the filling profile of the granular bulk material and accordingly change and lock the adjustment means in the distribution head.

The invention is moreover not limited to a distribution of a granular bulk material with the aid of air. Different gases can be supplied to the bulk material, including in particular inert gases which ensure that the bulk material can be loaded under a safe atmosphere—for example, if there is a risk of explosion.

The inventive loading head is preferably formed from metal sheets, but it can also be formed from a plastic material or other non-metal materials.

The inventive subject matter of the present invention results not only from the subject matter of the individual claims, but also from the combination of the individual claims with one another.

All the indications and features, including the abstract, disclosed in the documents, in particular the spatial design represented in the drawings, are claimed as essential to the invention, to the extent that, individually or in combination, they are novel in comparison to the prior art.

Below, the invention is explained in further detail in reference to drawings representing only one method of implementation. Here, additional features essential to the invention and advantages of the invention become apparent from the drawings and their description.

Figure 10:
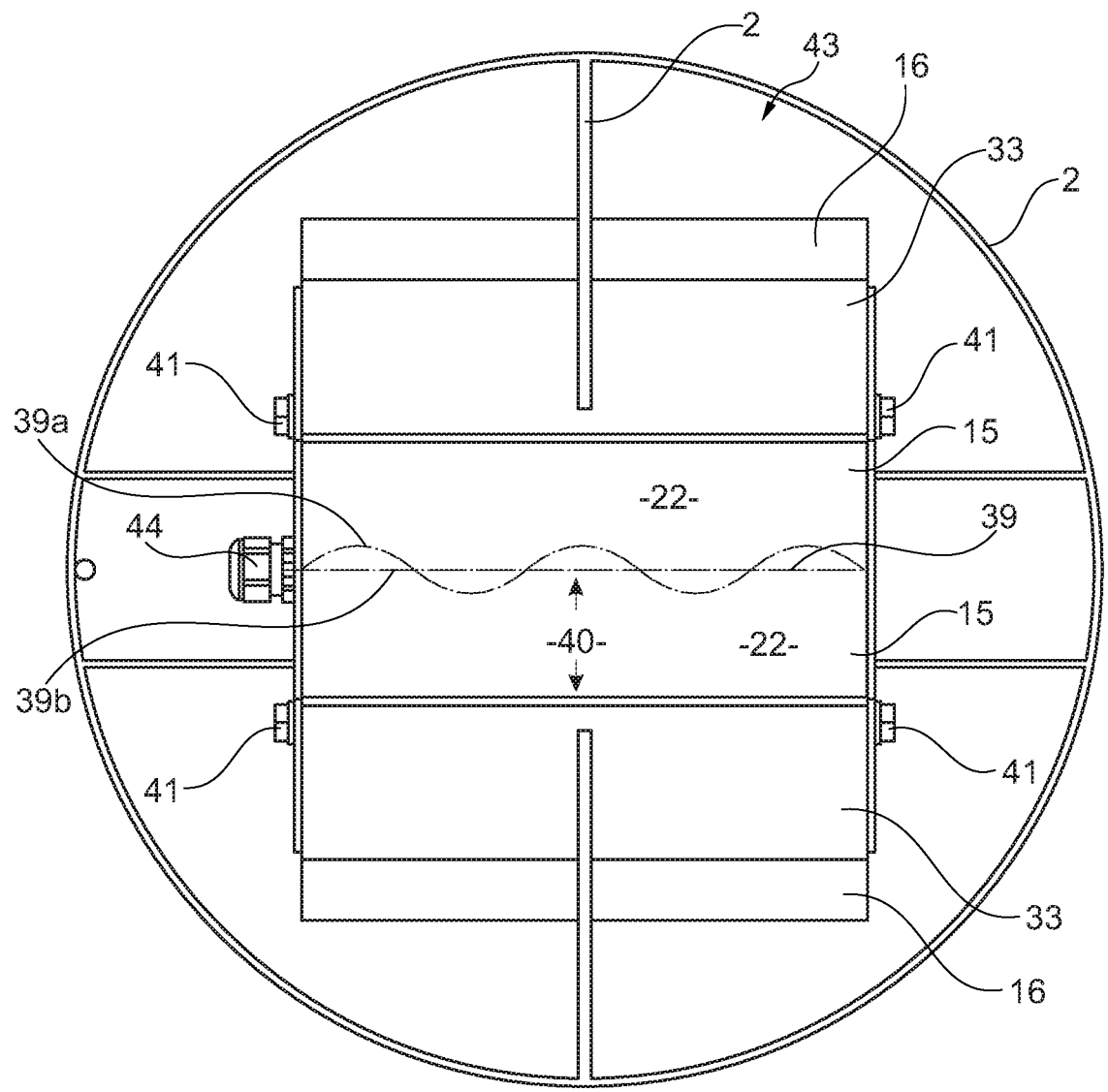
Figure 11:
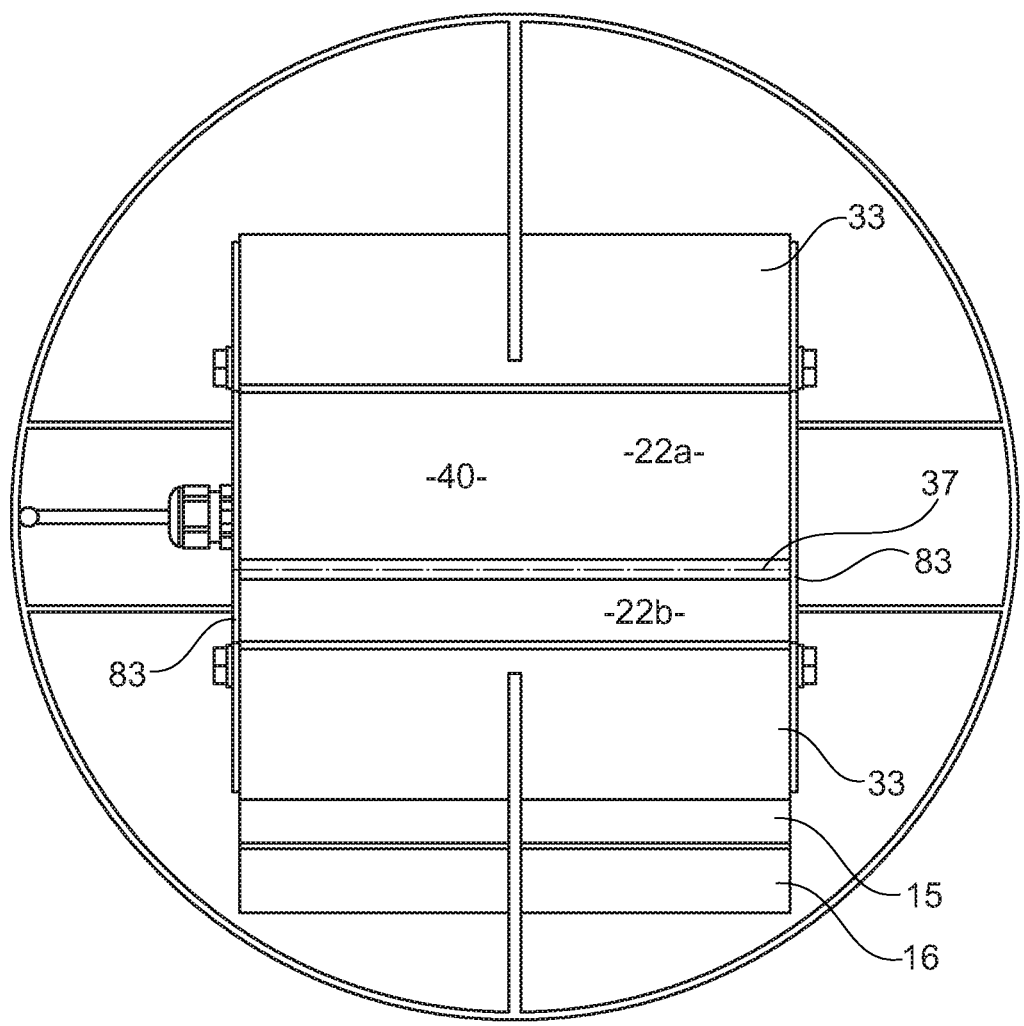
Figure 12:
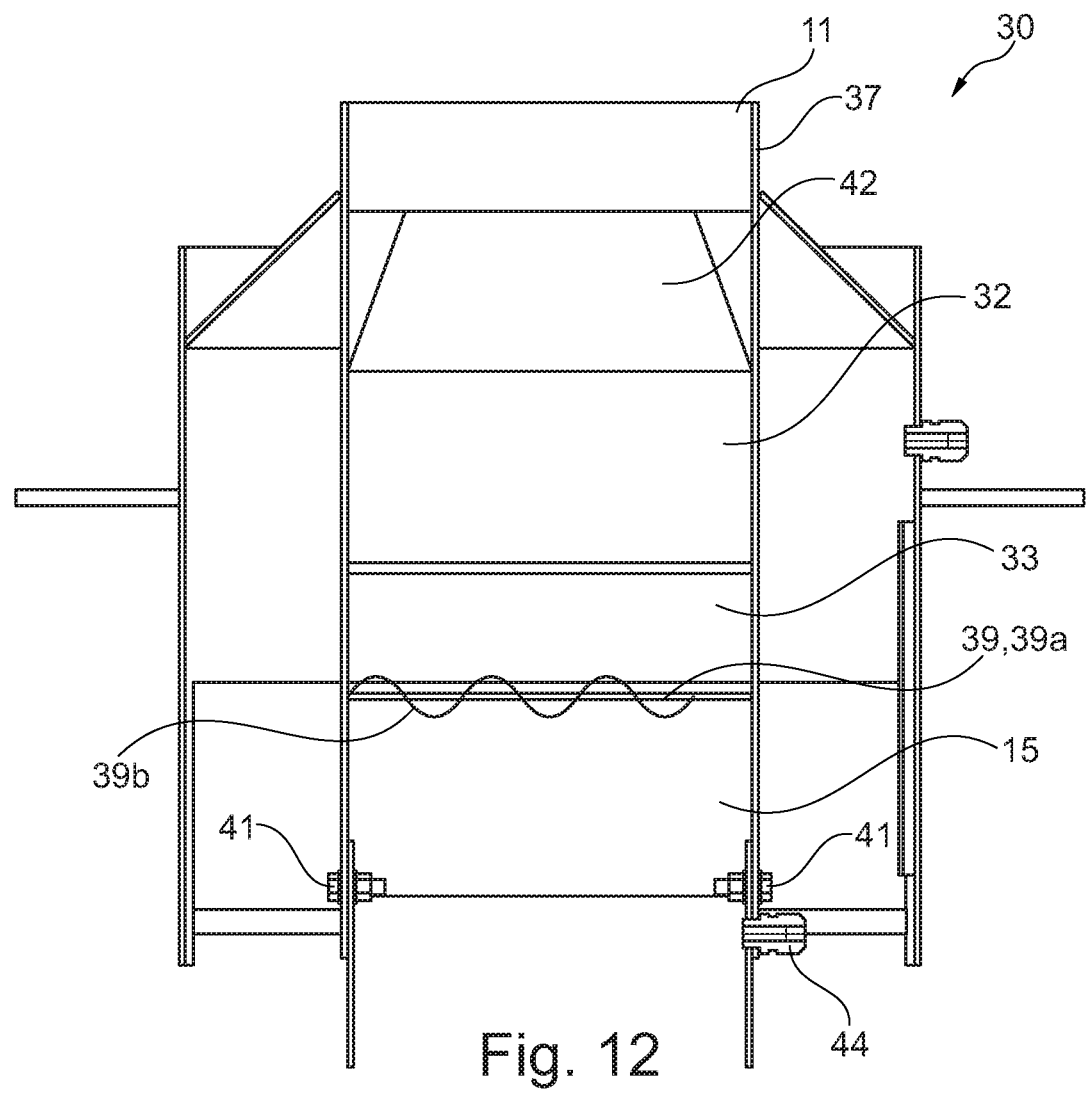
Figure 13:
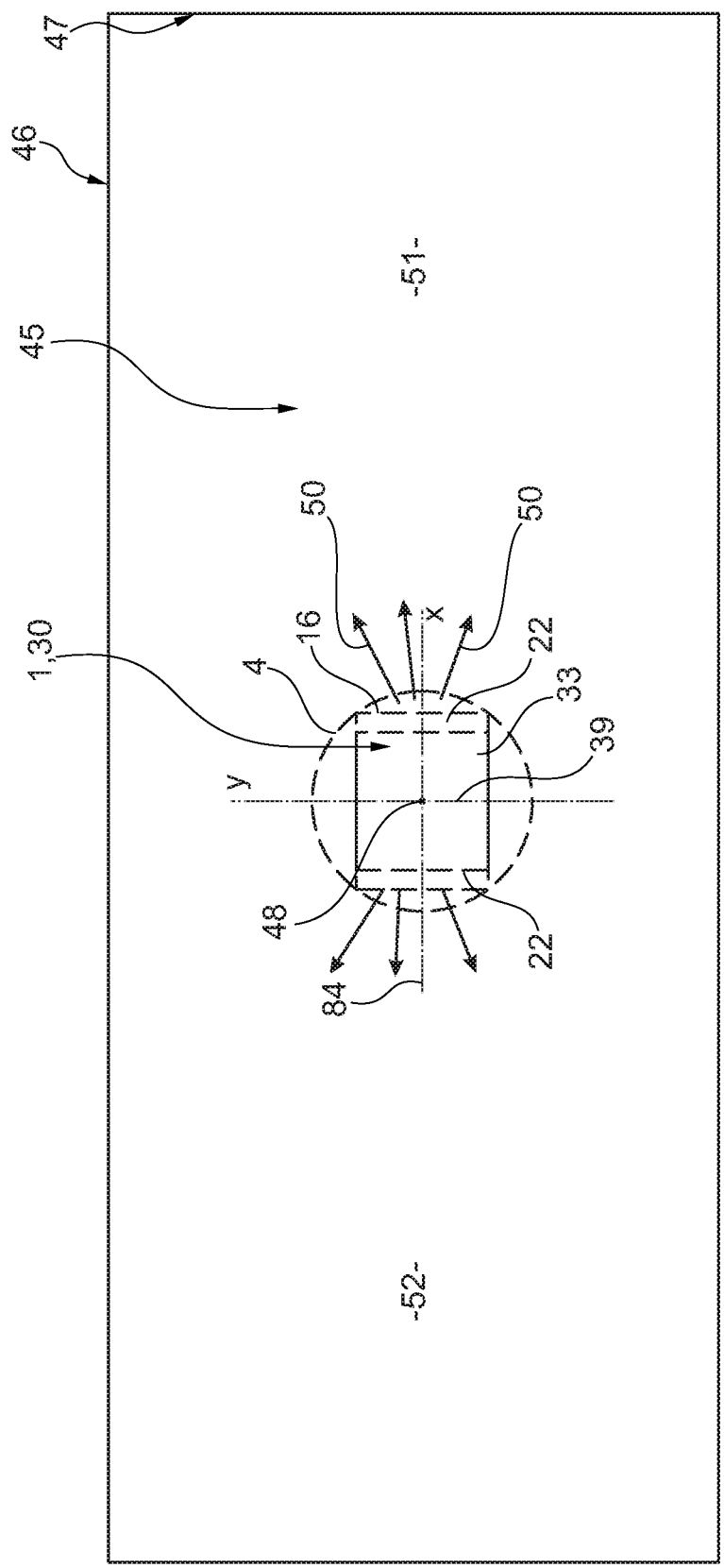
Figure 14:
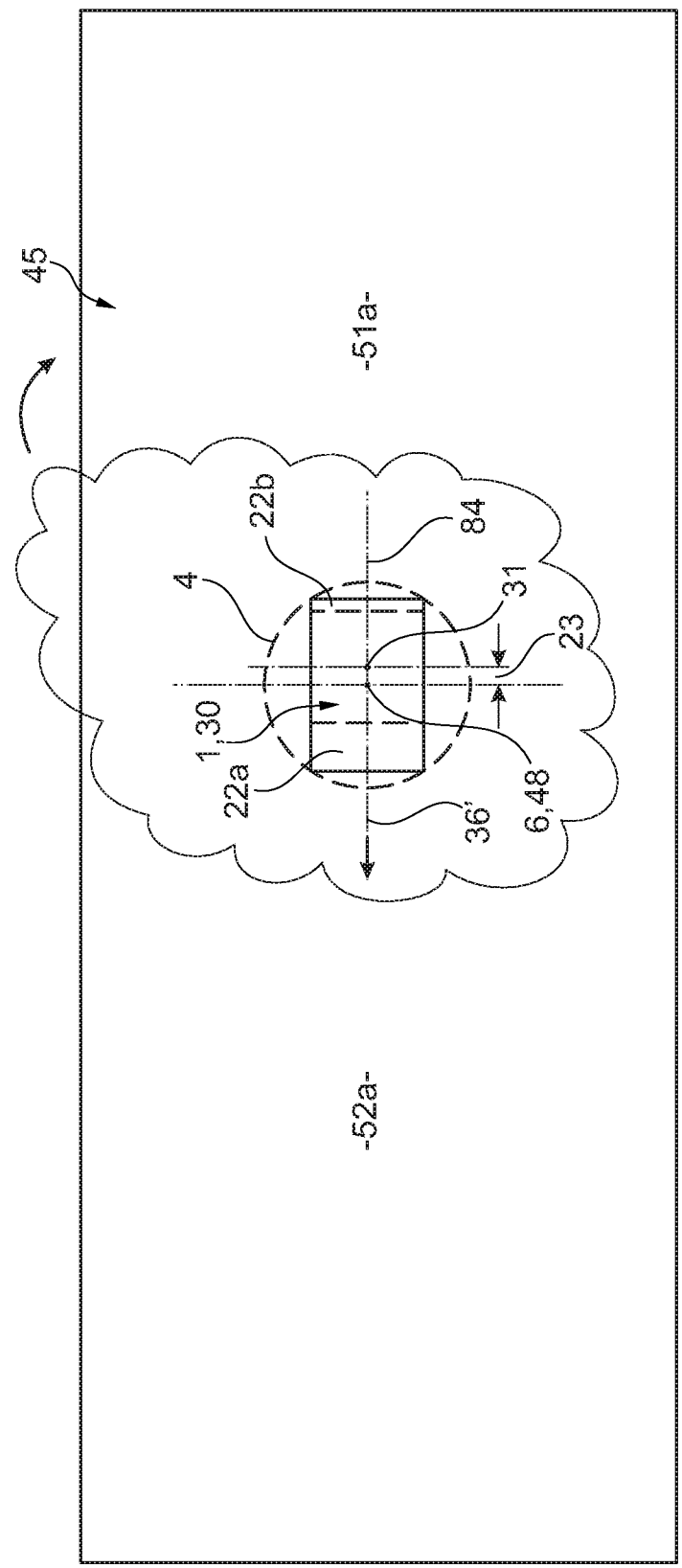
Figure 15:
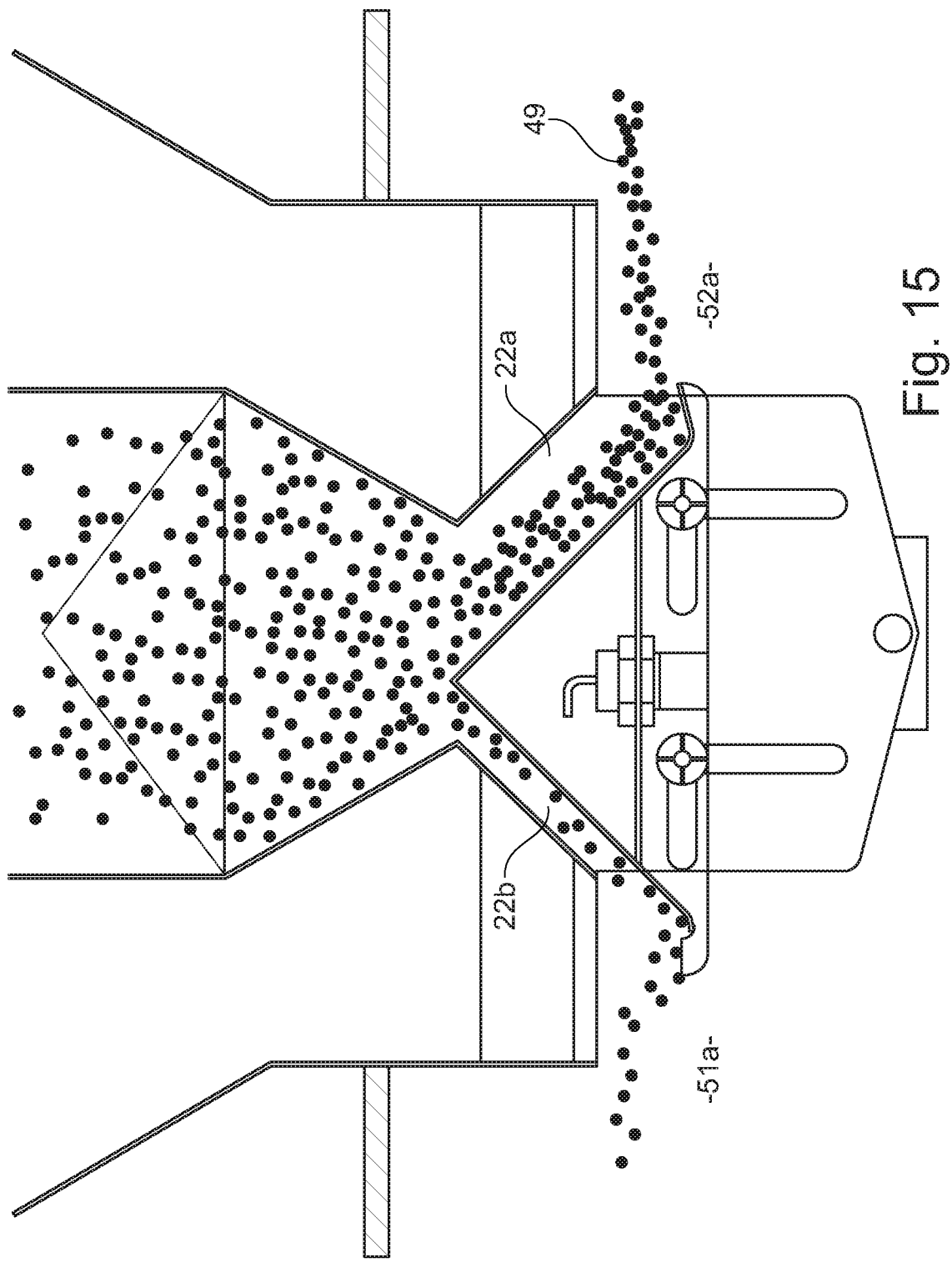

The drawings show:

FIG. 1: a diagrammatic representation of the filling process of a freight wagon with several dome covers;

FIG. 2: a first embodiment of a loading head in a round symmetric design in its central position;

FIG. 3: the same representation as in FIG. 2 in a position shifted to the left side;

FIG. 4: the same representation as in FIG. 2 in a position shifted to the right; side, wherein, in the comparison of FIG. 3 with FIG. 4, a height adjustment in the Z direction has also taken place;

FIG. 5: a second embodiment of a loading head with a rectangular contour and adjustment possibility in the X and Z direction;

FIG. 6: the same representation as in FIG. 5 in another shifted position;

FIG. 7: the same representation as in FIGS. 5 and 6 in an additional shifted position;

FIG. 8: the different shifted positions of the distribution head in the top view;

FIG. 9: a representation of the distribution head according to FIG. 8 in the side view with additional adjustment possibilities;

FIG. 10: a cross section along line X-X in FIG. 5;

FIG. 11: a cross section along line XI-XI in FIG. 6;

FIG. 12: a cross section along line XII-XII in FIG. 7;

FIG. 13: a distribution image of the bulk material in a rectangular filling container in the case of an arrangement of the distribution head centered in the middle;

FIG. 14: the same representation as in FIG. 13, wherein, however, the dome cover is arranged acentrically with respect to the middle region of the filling container and in addition the distribution head is shifted in the X direction; and FIG. 15: an image of the flow through a loading head in a situation according to FIG. 6.

In FIG. 1, a gravimetric loading system in general is represented, which consists essentially of a silo container 54 filled with the bulk material and filled via a filling line 55.

The filling material comes in as material flow 8 in arrow direction 9 via a discharge device 56 arranged on the outlet side and designed as a cellular wheel sluice, for example.

Downstream of the discharge device 56, a distributor switch 57 is arranged, by means of which the bulk material is distributed to different distribution lines 58.

Each distribution line 58 leads into an associated loading tube 73, on the front free end of which the inventive loading head 1, 30 is arranged.

In the depicted embodiment example, it is represented moreover that an additional air feed occurs via a fan 60; said fan is arranged on the loading device 72 and it suctions and compresses outside air and feeds it in this form via an air feed 59 downstream of the discharge device 56 into an associated acceleration nozzle 71. In this way, the granular filling stream is accelerated by the air stream.

The representation according to FIG. 1 shows different filling situations, wherein a total of four container sections 45 are associated with the freight wagon 74 to be filled. The freight wagon 74 can be moved on rails 75.

In the left container section 45, for example, a loading head 1, 30 is shown in its working position, wherein it is introduced into a dome cover 77 and protrudes into the dome cover opening 4. The two adjacent dome covers 76, 78 are open. The dome covers are arranged lying one after the other in alignment in the direction of the longitudinal extension 84 of all the container sections 45.

In the central container section 45 of the freight wagon 74, two dome covers 79, 80 are arranged which, however, are designed acentrically with respect to the central axis of the container section 45, so that, in this case, an acentric filling with the aid of the inventive loading head and a corresponding adjustment of the associated distribution head 43 has to occur.

In the depicted embodiment example, during the filling of the left container section 45, it is possible to provide that the air escaping from the container section 45 is removed via the loading head 1, 30 itself.

In another design, it is possible to provide that, instead, one dome cover or both dome covers 76, 78 are open.

The acentric filling of a container section 45 also applies to the adjacent container section, in which the dome covers 79, 80 are arranged acentrically with respect to the container central axis but in alignment in the central longitudinal extension 84, and the distribution head 43 associated there has to be shifted in the X direction in order to achieve a uniform filling.

Analogously, this also applies to the right container section 45 with the dome covers 76, 77, 78 represented there, wherein this container situation coincides with the left container section 45 and the associated dome covers 76, 77, 78.

In FIGS. 2 to 4, a first embodiment of a loading head 1 is represented, which consists substantially of rotationally symmetric parts, wherein the loading head 1 on the filling side consists of a cylindrical outlet connector 7 which is connected directly—according to FIG. 1—to the loading tube 73.

The outlet connector 7 is fastened, attached to the housing, in a housing connector 2 which supports a flange plate 3 on its underside.

According to FIG. 3, the flange plate 3 is put on the dome cover opening 4, and the dome cover flange 5 delimits the dome cover opening 4.

FIG. 2 shows the middle, central filling of a container section 45, wherein it can be seen that the longitudinal axis 6 of the outlet connector 7 continues downward centrally in the direction of an outlet opening 10 arranged there, and a distribution head 13 is arranged centrally in this outlet opening 10.

The invention is not limited to the flange plate 3 having a flat design and being put on an associated dome cover flange 5. It can also engage conically and thus in a self-centering manner in the dome cover opening 4 and be arranged there.

Moreover, FIG. 2 also shows that the cylindrical outlet connector 7 transitions into a cylinder tube 12 which has the same throughput cross section, so that the filling stream narrows from the cone inlet 11 having a widening diameter at the entry of the outlet connector 7, in the direction of the cylinder tube 12.

The distribution head 13 is held so that it can be adjusted with the aid of a height-adjustable spindle 25 on a spindle nut 26 in the Z direction (arrow direction 24), wherein the spindle nut 26 is covered on its head side with a protective cone 27. The spindle nut 26 is thus connected, attached to the housing, to the housing connector 2.

The distribution head 13 has a cone body 14 forming the outlet surface and forming a distribution contour 15 having a curved profile.

The distribution contour can be curved in a smooth and continuous manner; however, it can also have a discontinuous composition consisting of straight segments which are joined to one another forming substantially an arc-shaped curve.

On the outlet end of the cone body 14, a drop plate 16 with slightly upward directed inclination is present, in order to confer to the granulate impacting there a flight curve directed at a slant toward the cover of the container section 45.

For the rest, the contour of the drop plate 16 can be changed within broad limits. It also can have a contour such that a straight (horizontal) flight of the granular bulk material particles 49 impacting there occurs in the direction of the container interior.

An approximately cylindrical base body 17, which can also be omitted in another embodiment—not represented in the drawing—, adjoins the underside of the cone body 14.

In the inner space of the base body 17, the installation for a filling level sensor 19 can be arranged here.

On the underside of the base body 17, an axially downward directed hoop guard 18 is arranged, which encloses the filling level sensor 19 on its free front end in order to avoid damaging the filling level sensor 19 when the loading head 1 is put on a surface.

It is also important that the loading head 13 is designed so that it is adjustable in the Z direction (arrow direction 24), in order to change in this way the clear cross section of the outlet channel 22 forming in the region between the outlet opening 10 and the surface of the deflection surface 15.

In the depicted embodiment example, the outlet channel has exactly the same size on the left and on the right, and there is no transverse offset, as described moreover later in reference to FIGS. 3 and 4.

Thus, the bulk material flows out uniformly in arrow direction 8 and is guided in curved arrow direction 21 on the deflection surface 15 of the distribution head 13.

The electrical lines arranged in the interior space of the base body 17 can be introduced through the spindle 25 of the spindle nut 26, which is formed as a hollow body, and be led outward there (not represented in the drawing).

FIGS. 3 and 4 show a transverse offset 23 of the distribution head 13 in the two X directions, wherein moreover, in addition, in the comparison between FIG. 3 and FIG. 4, a lifting adjustment in the Z direction (arrow direction 24) has been carried out.

Thus, FIG. 3 shows a lateral offset 36 between the central longitudinal axis 6 and the outlet axis 31 around the transverse offset 23, while, in FIG. 4, the reversed case is represented, in that starting from the central longitudinal axis 6, the outlet axis 31 has been offset to the right in arrow direction 36'.

In FIG. 3, on the other hand, the arrow direction 36 is drawn in in the opposite direction relative to arrow direction 36'.

This leads to the left outlet channel 22b having a smaller size in FIG. 3 than the right outlet channel 22a, so that an increased filling stream is delivered to the right via the outlet channel 22a whose cross section is increased in comparison to that which is delivered via the outlet channel 22b of smaller size.

In the same way, in FIG. 3, it is represented that the clear width of the two outlet channels 22a, 22b has been decreased overall, since the entire distribution head 13 has been adjusted upward in arrow direction 24 in the Z direction toward the fixed cylinder tube 12.

FIG. 4 also shows, only as an example, the opposite offset in arrow direction 36', wherein it can be seen that now the left-side outlet channel 22a is increased in cross section compared to the right-side outlet channel 22b and also that overall the clear width of the two outlet channels 22a, 22b has been increased in that the distribution head 13 has been adjusted downward in the Z direction in arrow direction 24.

Moreover, associated with all the embodiment examples is a third adjustment axis, namely the possibility of designing the entire distribution head 13 so that it can be inclined at an angle with respect to the outlet axis 31.

This is shown only diagrammatically in FIG. 4, although this inclinable design is applicable and exists for all the loading heads 1, 30 described.

It is only for the purpose of simplifying the drawing that this possibility has been shown only in FIG. 4, and it relates to a ball joint 28 which is arranged in a fixed manner, for example, in the region of the spindle nut 26, and which makes it possible that the outlet axis 31 can be inclined continuously and locked in the direction of the outlet axis 31a to the right or in the direction of the outlet axis 31b on the left in each case by a pivot angle 29.

The different adjustment possibilities of the distribution head 13 are represented diagrammatically in FIGS. 8 and 9, wherein these adjustment possibilities can be present alternatively or additively.

These adjustment possibilities apply to all the embodiments of the loading heads 1, 30 described.

In the embodiment example according to FIGS. 5 to 7, a loading head 30, which in principle has a rectangular profile, is represented, wherein starting from an outlet connector 37 having a circular profile, which again rests in a fixed manner in a housing connector 2 and which is provided with a flange plate 3, a rectangular cross section now adjoins this circular cross section and leads into a rectangular centering tube 32.

The transition region is indicated with reference numeral 20 between the circular cross section of the outlet connector 37 and the rectangular profile of the centering tube 32.

The centering tube 32 gets smaller in the direction of its outlet end at the outlet opening 40 and widens beyond the outlet opening 40 into an associated section tube 33 which is represented as opening conically outwardly.

Now it is important that the distribution head 43 depicted there is a transverse guide 34 which can be adjusted in the direction of the X axis (arrow direction 36, 36') and locked and which, if desired, can also moreover be shifted in the direction of the Z axis in a lifting guide 35 designed as an elongate hole and locked.

In the embodiment example, the adjustment in the X direction and in the Z direction is achieved with a single locking screw 41 which can be adjusted in the two intersecting elongate holes 34, 35 and locked.

Thus, the distribution head 43 can be shifted freely in the X direction and/or in the Z direction and then fixed.

On the lower end of the distribution head 43, a downward directed filling level sensor 19 is present, and the lower flange of the distribution head 43 is used as hoop guard 18, as represented in FIG. 7.

In the embodiment example shown, the inlet-side portion of the distribution head 43 is formed by a ridge-side roof edge 39, from which the deflection surfaces 15 are formed sloping smoothly at a slant in both directions.

In each case, the above-described drop plate 16 is arranged on the outer end of this deflection surface 15.

The term "drop plate 16" refers only to the conditions represented, since the profile of the distribution head 43 is substantially rectangular, as represented in reference to the subsequent drawings.

The embodiment example of FIGS. 5 to 7 shows that this distribution head 43 is also designed so that it can be inclined. This is represented symbolically by a pivot axis 38 in the region of the roof edge 39, so that the entire distribution head 43 can be designed so that it can pivot by the pivot angle 29 around this pivot axis 38 in the outlet axes 31a, 31b shown in the drawing.

FIG. 10 shows a cross section along line X-X in FIG. 5, wherein additional details of the rectangular profile shape of the outlet head 43 can be seen. It can be seen that the above-described roof edge 39 extends in the middle region and forms two identical outlet channels 22, wherein the channel formed thereby is referred to overall as the outlet opening 40.

FIG. 10 shows, in a different design, that it is not necessary for the solution that the roof edge 39 be designed as a ridge line. It can also be designed curved, as represented by means of the contour 39a. Thus, it can accordingly have a contour in the X and/or Y and/or Z direction.

Accordingly, it can be designed to be recessed in the plane of the drawing of FIG. 10, as represented only partially by the contour 39b and as can be seen better in FIG. 12.

Other than that, identical reference numerals are used for identical parts, wherein a lateral cable connection sleeve 44 can be seen, and, for the rest, the locking screws 41 can also be seen, which are provided for fixing the distribution head 43 on the outlet connector 37 attached to the housing.

Instead of the curved contour 39a, which was included in the drawing in FIG. 10 only as an example for the course of a variation of the roof edge 39, symmetrical triangular profile shapes can also be used.

In the same way, straight sections arranged with mutual offset can be provided, which extend only upward or downward in terms of height level relative to the plane of the drawing of FIG. 10 (Z direction).

Said straight sections are then designed alternatingly with their height differences.

FIG. 11 shows a cross section along line XI-XI in FIG. 6.

Here, identical reference numerals are used for identical parts, and it can be seen that an asymmetric outlet opening 40 has been created from the rectangular profile of the loading head 30, and that the cross section of the outlet channel 22a is thus substantially greater than the cross section of the outlet channel 22b.

Thus, a dividing of the mass stream occurs in such a manner that a larger filling material stream exits from the outlet channel 22a than by comparison from the outlet channel 22b which has a smaller cross section.

For the rest, FIG. 11 also shows that the outlet channel 22, 22a, 22b is delimited by lateral delimitation walls 83, so that bulk material particles 49 cannot exit in this direction (Y direction), but can exit only in the X direction.

The invention is not limited to this. In another design, it is possible to provide that openings are present in the lateral delimitation wall 83 in order to enable a deliberate exit of bulk material particles 49 in the Y direction in addition to the delivery in the X direction.

FIG. 12 shows a middle cross section in arrow direction XII-XII in FIG. 5, wherein identical reference numerals are used for identical parts. It can be seen that, starting from the cone inlet 11 which now has a circular profile, there is now a transition in a transition region to the rectangular section tube 42, and said section tube is adjoined by the centering tube 32 having a rectangular profile.

FIG. 12 also shows that the roof edge 39 of straight design can be designed not only in the shape of a curved, sawtooth-shaped or differently profiled contour 39a, but also can be designed as a structure with a wavy, sawtooth-shape or with an alternating height offset.

FIG. 13 shows a symmetrical filling image in the inner space of a rectangular container part, wherein it can be seen that the long side of the loading head 30 now coincides with the long side of the rectangular container part 45. Thus, the longer delimitation of the loading head 30 is parallel to the longer container wall 46, and the shorter side of the loading head is parallel to the shorter container wall 47.

In other embodiments, the proportion can also be implemented to be equal (square head) or shorter. However, the first-mentioned longer variant is preferred.

The rectangular profile of the loading head 30 is accordingly adapted with its distribution head 30 of adjustable design to the rectangular profile of the container section 45.

In the depicted embodiment example it can be seen therefore that, from the two symmetric and identically profiled outlet openings 22 of the distribution head 43, the bulk material particles 49 flow out uniformly in arrow directions 50, since an offset in the X direction between the distribution head 43 and the loading head 30 does not apply.

The center 48 of the distribution head 43 accordingly coincides with the center of the dome cover opening 4.

In FIG. 14, an asymmetric filling of a container section 45 is represented, in which the dome cover 4 is arranged acentrically. The asymmetric filling situation is taken into account in that, in comparison to the symmetric accumulation 51, 52 in FIG. 13, an asymmetric accumulation 51a, 52a now occurs in FIG. 14. In order to ensure these accumulations 51a, 52a with the same filling height, it is provided that, in the asymmetric dome cover, the inventive loading head 1, 30 has now been shifted starting from its longitudinal axis 6 to the left by a transverse offset 23 in arrow direction 36'.

The outlet axis 31 is offset in arrow direction 36' from the longitudinal axis 6 to the left.

In this manner, it is ensured that in the case of symmetric outlet channels 22 of identical design, due to the transverse offset 23, a greater accumulation 52a is achieved on the left side in comparison to the accumulation 51a on the right side. However, this shifting is possible only to a limited extent, and it is only used in certain application cases. However, a change of the outlet channels as described below is the preferred solution for filling asymmetric containers or in the case of asymmetric positions of filling connectors.

The invention is not limited thereto, since FIG. 14 shows only a single embodiment example.

Using the above-mentioned features, it is also possible to provide that the cross section of the left outlet channel 22 is selected to be substantially larger than the cross section of the right outlet channel 22, so that a situation results as represented in reference to FIG. 7.

Here, the cross section of the left outlet channel 22a is increased substantially in comparison to the cross section of the right outlet channel 22b.

Thus, the invention not only relates to a transverse offset 23 of the distribution head 43 in the X direction, but also to the possibility of changing the effective outlet cross section of the outlet channels 22a, 22b.

For the rest, in the filling image according to FIG. 14, it is not represented that the additional possibility of inclining the loading head 1 and 30 also exists, in order thus to ensure an additional modification of the flight curve of the bulk material particles 49 in the region of the accumulations 51*a* and 52*a*.

In the image of the flow according to FIG. 15, such a situation is represented in which a larger volume stream of bulk material particles 49 flows from the larger sized outlet channel 22*a* than, by comparison, through the left outlet channel 22*b*.

In FIG. 7, it is represented only as an example—and this applies to all the embodiments—that, laterally on the respective loading head 1, 30, an additional aeration opening 81 can be arranged, through which air collecting in the container section 45 can be removed to the outside in arrow direction 82.

LEGEND FOR DRAWINGS

1 Loading head
2 Housing connector
3 Flange plate
4 Dome cover opening
5 Dome cover flange
6 Longitudinal axis
7 Outlet connector
8 Material flow
9 Arrow direction
10 Outlet opening
11 Cone inlet
12 Cylinder tube
13 Distribution head
14 Cone body
15 Deflection surface
16 Drop plate
17 Base body
18 Hoop guard
19 Filling level sensor
20 Transition region
21 Arrow direction
22 Outlet channel a, b
23 Transverse offset
24 Arrow direction
25 Spindle
26 Spindle nut
27 Protective cone
28 Ball joint
29 Pivot angle
30 Loading head
31 Outlet axis a, b
32 Centering tube
33 Section tube
34 Transverse guide
35 Lifting guide
36 Arrow direction 36'
37 Outlet connector
38 Pivot axis
39 Roof edge contour a, contour b
40 Outlet opening
41 Locking screw
42 Section tube
43 Distribution head
44 Cable connection sleeve
45 Container section
46 Container wall (long)
47 Container wall (short)
48 Center
49 Bulk material particle
50 Arrow direction
51 Accumulation 51*a*
52 Accumulation 52*a*
53 Arrow direction
54 Silo container
55 Filing line
56 Discharge device
57 Distributer switch
58 Distribution line
59 Air feed
60 Fan
71 Acceleration nozzle
72 Loading device
73 Loading tube (telescopic tube)
74 Freight wagon
75 Rail
76 Dome cover
77 Dome cover
78 Dome cover
79 Dome cover
80 Dome cover
81 Aeration opening
82 Arrow direction
83 Delimitation wall
84 Longitudinal extension (container section 45)

The invention claimed is:

1. A loading device of a pneumatic loading system for the uniform introduction of bulk material into the inner space of container sections, comprising:
    a loading tube having an inlet and an outlet, the bulk material being fed into the inlet of the loading tube from a distribution line;
    a loading head arranged on the outlet of the loading tube, the bulk material flowing through the loading head;
    an outlet connector comprising a first end connected to the outlet of the loading tube, and a second end, the bulk material flowing through the outlet connector,
    a distribution head disposed at the second end of the outlet connector to receive the bulk material and having an approximately conical deflection outer surface to laterally deflect the received bulk material into the container sections, and
    an adjustable locking device to shift positions of the distribution head at least along a direction parallel to a longitudinal extension of the container sections and lock the distribution head in a filling position, the longitudinal extension extending parallel to a direction of travel of the container sections,
    wherein lateral outlet openings for the bulk material are defined between the second end of the outlet connector and the deflection surface of the distribution head, and
    wherein by shifting positions of the distribution head, a size of a cross section of lateral outlet openings through which the bulk material passes differs depending on a longitudinal position of the distribution head within the second end of the outlet connector.

2. The loading head according to claim 1, wherein the distribution head is configured and connected to be shifted additionally in a transverse direction relative to the direction of the longitudinal extension of the container sections and locked on the loading head.

3. The loading head according to claim 1, wherein the distribution head is arranged and connected height-adjustably on the loading head.

4. The loading head according to claim 1, wherein the distribution head is configured and connected to be inclined at an angle relative to a longitudinal axis of the loading head.

5. The loading head according to claim 1, wherein the loading head has a shape of a rectangle or of a square and has at least one section tube having a rectangular or square profile and forming the outlet opening, the at least one section tube abutting a face of the distribution head, the distribution head having a rectangular or square profile, the at least one section tube having open ends defining lateral outlet openings at an end of the at least one section tube.

6. The loading head according to claim 1, wherein the loading head has a circular profile and has at least one section tube having a circular profile and forming the outlet opening, the at least one section tube abutting a face of the distribution head, the distribution head having a circular profile, the at least one section tube having open ends defining lateral outlet openings.

7. The loading head according to claim 1, wherein the adjustable locking device comprises locking screws guided in elongate holes.

8. The loading head according to claim 1, wherein the adjustable locking device comprises at least one of locking screws guided in elongate holes, tensioning means, and and/or clamping means.

9. The loading head according to claim 1, wherein the adjustable locking device comprises at least one of electrical, fluidic or electromechanical drive means.

10. The loading head according to claim 1, further comprising a drop plate directed upwardly at a slant arranged on a free outer end of the deflection surface of the distribution head.

* * * * *